Patented Jan. 4, 1944

2,338,543

UNITED STATES PATENT OFFICE 2,338,543

MODIFIED PHENOLIC RESIN

Israel Rosenblum, New York, N. Y.

No Drawing. Application January 26, 1939,
Serial No. 252,941

4 Claims. (Cl. 260—25)

The present invention relates to fusible and soluble condensates of a phenol, an aldehyde, and a solid terpene material, particularly rosin, for the manufacture of coating compositions of various types.

My invention relates in particular to resinous compositions wherein alkali-condensed and acid-precipitated phenol-aldehyde resins are catalytically combined with rosin.

According to the present invention, a phenol and an aqueous aldehyde, preferably formaldehyde, are condensed under strongly basic conditions until an intermediate condensation stage is reached which on acidification of the reaction product yields a more or less syrupy mass which can be further heated. The alkali condensate is thereupon neutralized or, preferably, acidified, and the oily or syrupy condensate is then separated in any suitable manner from the water, as by decanting or syphoning. The mass may then be heated to drive off the water, until it is solid at room temperature but is still reactive and soluble. Preferably, however, the syrupy mass, while still moist, is combined with a suitable acidic natural resin, such as rosin, in the presence of sulfuric acid. This acid appears to effect a more nearly complete and stable chemical combination between the phenol-aldehyde condensate and the rosin, thereby producing a resin of highly desirable properties, but quite unexpectedly, the sulfuric acid exerts no deleterious action on any of the components of the final resin and in particular, causes no darkening or charring in the color of the resin. It is unnecessary to make any special provision for any separation of the acid as it appears to be decomposed during the reaction and to be expelled with the volatile matter. Highly satisfactory results are obtained by the use of a higher phenol, that is, a phenol having a substituting group containing more than one carbon atom and by the use of what is commonly known as polymerized rosin. Where free rosin is employed, free acid groups may be neutralized, after the catalytic reaction with the phenol-aldehyde condensate, in any suitable way, as with the aid of glycerol.

The products obtained with the aid of sulfuric acid as a catalyst have a higher melting point and far superior color retention in varnishes than resins produced in the absence of the catalyst; in addition, the acid number falls considerably during the reaction with the sulfuric acid. The free acid groups may be neutralized also with glycol or with partially esterified glycerol or polyglycerols, such as the partial glycerol esters of dibasic and monobasic acids, including phthalic, maleic, sebacic, adipic and fatty oil acids such as the acids of linseed, tung and other vegetable oils or mixtures of the same. A solvent such as varnolene or hi-flash naphtha or the like, is preferably employed with the rosin.

If desired, a liquid terpene, such as dipentene, terpineol or pine oil, may be present during the initial or subsequent reaction. Thus, the initial condensate obtained, in accordance with the process described in my copending application Serial No. 243,881 filed December 3, 1938, now Patent No. 2,279,526, by precipitating the initial reaction product with acid may be employed in my present process by reacting the same with rosin or ester gum with the aid of sulfuric acid.

The reaction of the rosin with the initial phenol-aldehyde condensate in the presence of sulfuric acid appears to bring about either a new reaction between these materials or a known reaction to a much higher degree, with the result that a a resin is obtained which is capable of producing superior color retentive and harder coatings when incorporated in a suitable vehicle, such as tung oil, linseed oil and the like.

As already indicated, the initial condensate of the phenol and aldehyde should be reacted only to the point at which, on acidification, there is obtained a more or less liquid product which, however, separates readily from the water. The rosin, together with the sulfuric acid, may be reacted with this acid-precipitated initial reaction product either before or after the separation of the water therefrom or the heating thereof to elevated temperatures for purposes of dehydration.

In carrying out my invention, a substituted phenol, with or without an addition of ordinary phenol, preferably in minor proportions, and aqueous aldehyde, such as formaldehyde, are first condensed with the aid of a sufficient amount of basic agent to keep the condensate in solution. Any suitable solvent may be present, if desired, and the reacting mass may include a liquid terpene, as above explained. Before the condensation has reached a point at which, after acidification, a more or less solid product would be obtained which could be heated to elevated temperatures with rosin only with difficulty, the mass is acidified. A quantity of rosin, together with sulfuric acid, preferably dilute, is now added to the resin, and the mass then heated to higher temperatures to complete the reaction and to drive off volatile material, the heating being continued until a resin which is solid at room temperature is obtained. The material may be neutralized with glycerol after heating to elevated temperatures, for example 180° C. In place of glycerol, as already pointed out, glycol, polyglycerols and partial esters of these materials may be employed.

The invention will be described more in detail with the aid of the following examples, which are presented purely for purposes of illustration and not by way of limitation.

Example 1

1000 grams of rosin (gum rosin or wood rosin) are heated with 500 grams of hi-flash naphtha until the rosin is dissolved. To this solution there is then added the reactive acid-precipitated condensate, in the form of a syrup, prepared by condensing paratertiary amyl phenol, formaldehyde solution, and sodium hydroxide in the proportion of about 5½ mols of the phenol to 9.9 mols of formaldehyde and 100 grams of sodium hydroxide dissolved in 733 parts of water, with or wthout dipentene (about 220 grams if it is used); the phenol, formaldehyde and sodium hydroxide being heated at a temperature of about 60 to 90° for a length of time such that upon acidification, a sprupy or plastic condensate separates out, all as described in my co-pending application Serial No. 243,881, filed December 3, 1938. The quantity of phenolic condensate which is added to the solution of rosin is such as corresponds to 200 grams of the phenolic resin (phenol-formaldehyde reaction product, together with combined dipentene, if the latter has been employed). The actual phenolic resin contained in the syrup can be determined by withdrawing samples and heating it until volatile matter has been expelled and a resin which is solid at room temperature but still soluble is obtained.

The mixture of rosin solution and syrupy amyl-phenol condensate is heated to 70–80° C. and stirred until it is practically uniform. To the mixture there is now added a 20% solution of sulfuric acid in three or more portions, the total being 30 to 60 grams or about ½ to 1% based on the weight of the final resinous product. The acidified mass is heated gradually to about 200° C. to cause reaction to take place and to expel volatile matter; whereupon 100 grams of glycerine are added and the temperature gradually raised to about 250°. The temperature is maintained at about this value until the esterfication is completed. There is obtained a hard, brilliant, pale resin having an acid number of about 15 and a metling point of about 110° C., which is readily soluble in varnish oils and varnish solvents. With wood oil, the resin gives a varnish of unusual durability and high resistance to chemical influences.

Example 2

The procedure described under Example 1 is followed except that any treated variety of rosin, such as purified, bleached, or dry distilled rosin is employed, or one whose melting point has been raised by polymerization or other change. The degree of such modification can be varied and greater or smaller proportions of the reactive condensate syrup described under Example 1 can be employed.

Example 3

Instead of employing glycerol as the neutralizing agent, a partial glycerol ester of phthalic anhydride may be employed. Thus the acidic reaction product of rosin and the reactive phenolic condensate may be heated with about 20% of partial glycerol phthalic ester. The latter may be prepared, for example, by heating

| | Grams |
|---|---|
| Phthalic anhydride | 74 |
| Glycerol | 61 | for about 2 hours at 180–200° C. This total product is added to about 375 grams of the sulfuric acid catalyzed reaction product of rosin and the amyl-phenol-formaldehyde condensate described in Example 1. The final heating may take place at 250° C. A resin having a melting point of about 120° C. is obtained which is suitable for the manufacture of varnishes, giving very pale films of great outdoor durability.

Example 4

| | Grams |
|---|---|
| Maleic anhydride | 49 |
| Glycerol | 131 | are heated for about 2 hours at 180–200° C. This partial maleic acid ester of glycerol is then employed to neutralize the rosin-phenol-aldehyde reaction product obtained according to Example 1. As a maximum of only about 4% of maleic anhydride can be incorporated in the resin under these conditions, the total quantity produced by the above reaction is treated with 1225 grams of the acidic reaction product of rosin and the reactive syrupy condensate of amyl phenol and formaldehyde obtained according to Example 1 with the aid of the acid catalyst. The mixture is heated to 250° and the heating continued until the volatile matter has been driven off and the esterification is completed. The product is charocterized by a high melting point and by the highly desirable properties of a varnish made therewith.

Example 5

| | Grams |
|---|---|
| Sebacic acid | 202 |
| Glycerol | 94 | are heated to 180–200° C. for about 3 hours. A maximum of about 50% of sebacic acid ester can be introduced in this way into a rosin and phenol-formaldehyde resin mixture. To the partial ester reaction product there may be added about 400 grams of the acidic, acid-catalyzed reaction product of rosin and the reactive amyl-phenol-formaldehyde condensate obtained according to Example 1. The mixture is heated at about 250° C. until the volatile matter has been driven off and the esterification is complete. A somewhat plastic resin is obtained which is soluble in lacquer solvents and can be employed in nitrocellulose lacquers.

Example 6

| | Grams |
|---|---|
| Rosin | 300 |
| Dipentene | 400 |
| High flash naphtha | 600 | are heated until the solution is uniform. To this solution there is added enough of a reactive butyl phenol-formaldehyde condensate to yield a final product weighing about 470 grams. The butyl condensate may be prepared by condensing approximately 5½ mols of the phenol with 10 to 12 mols of formaldehyde in aqueous solution in the presence of a sufficient amount of sodium hydroxide or other alkaline catalyst to keep the initial condensate in solution. This mass is then acidified with hydrochloric, sulfuric, acetic or other acid to effect precipitation of a syrupy resin. As in the case of the procedure described in Example 1, dipentene or other liquid terpene or mixture of terpenes, such as terpineol, pine oil, etc., may be reacted with the phenol and formaldehyde.

The mixture of the rosin solution and the butyl phenol condensate is then heated in the presence of sulfuric acid as described in Example 1, the product being ultimately neutralized with about 30 grams of glycerol. The product has a rather high melting point (105–110° C.) and has an even greater durability than a product made with rosin alone (i. e., without the dipentene).

Considerable variation from the proportions indicated in the above examples may be resorted to, as will be obvious to those skilled in the art. Where dipentene is suggested, other terpenic material capable of combining with phenol or with a phenol-formaldehyde condensate, may be used in equivalent proportions. In place of the partial phthalic, maleic and sebacic acid esters of glycerol, there may be employed also the partial esters of other polyhydric alcohols, as of ethylene glycol, diethylene glycol, sorbitol, etc., and the acid may be either polybasic or monobasic, the latter acids including those obtainable by hydrolysis of fatty triglycerides, in which case resins of modified properties will be obtained.

The butyl and amyl phenols specifically referred to in the above examples may be replaced in whole or in part by other substituted phenols, including not only the homologues of ordinary phenol but also phenols having other than alkyl groups, for example, phenyl phenol and other aryl and aralkyl substituted phenols. Among the other phenols that may be employed are the xylenols, octyl phenol and the condensation products of phenols with ketones, such as dihydroxy diphenyl methane, dihydroxy dimethyl diphenyl methane, the higher homologues of these compounds and also the reaction products of phenols with aromatic ketones, such as acetophenone.

While sulfuric acid has proved to be most satisfactory as the catalyst for effecting combination between the rosin and the reactive phenolic condensate, particularly as it requires no special measure for its removal since it becomes decomposed during the reaction, without, however, destroying any appreciable part of the reaction products, other acidic materials may be employed, such as hydrochloric acid and other non-oxidizing strong mineral acids, the acid chlorides, such as zinc and aluminum chlorides, and the like. Also, the rosin may be replaced in whole or in part by ester gum, in which case, of course, the addition of a polyhydric alcohol or a partial polyhydric alcohol ester is wholly or partly dispensed with. However, better results are generally obtained by the use of rosin followed by esterification with glycerol or the like.

It may be mentioned that upon reaction with the phenol-formaldehyde condensate in the presence of the acidic catalyst, the rosin no longer gives the Lieberman-Storch reaction for rosin. Moreover, during the reaction with sulfuric acid, for example, the acid number of the mixture falls considerably to about 115) prior to reaction with the glycerol or equivalent alcohol material.

I claim:

1. Process for the manufacture of resinous materials soluble in varnish oils which comprises condensing one mol of a phenol nuclearly substituted by a hydrocarbon radical of a plurality of carbon atoms, with about 2 mols of formaldehyde in the presence of a sufficient amount of an alkaline catalyst to keep the condensate in aqueous solution, continuing condensation until, on acidification, a liquid condensate separates out, acidifying the reaction product and then heating the same with rosin in the presence of a non-oxidizing strong mineral acid catalyst.

2. Process according to claim 1, wherein the phenol is p-tertiary amyl phenol.

3. Process according to claim 1 wherein the acid number of the product is reduced by heating with the soluble product obtained by reacting maleic anhydride with an excess of glycerol for a limited time.

4. Process according to claim 1 wherein dipentene is reacted with the acid-separated phenol-formaldehyde condensate along with the rosin.

ISRAEL ROSENBLUM.